US009804591B2

(12) United States Patent
Vicario et al.

(10) Patent No.: US 9,804,591 B2
(45) Date of Patent: Oct. 31, 2017

(54) JOB SCHEDULER FOR ELECTROMECHANICAL SYSTEM FOR BIOLOGICAL ANALYSES

(71) Applicant: BIOMERIEUX, Marcy l'Etoile (FR)

(72) Inventors: Enrico Vicario, Florence (IT); Lorenzo Ridi, Florence (IT); Andrea Carignano, Pistoia (IT); Jacopo Torrini, Florence (IT)

(73) Assignee: BIOMERIEUX, Marcy l'Etoile (FR)

( * ) Notice: Subject to any disclaimer, the term of this patent is extended or adjusted under 35 U.S.C. 154(b) by 661 days.

(21) Appl. No.: 14/364,455

(22) PCT Filed: Dec. 13, 2012

(86) PCT No.: PCT/EP2012/075468
§ 371 (c)(1),
(2) Date: Jun. 11, 2014

(87) PCT Pub. No.: WO2013/098088
PCT Pub. Date: Jul. 4, 2013

(65) Prior Publication Data
US 2014/0303766 A1 Oct. 9, 2014

(30) Foreign Application Priority Data
Dec. 30, 2011 (EP) .................................... 11196275

(51) Int. Cl.
*G05B 19/418* (2006.01)
*G06F 9/48* (2006.01)

(52) U.S. Cl.
CPC ..... *G05B 19/41865* (2013.01); *G06F 9/4881* (2013.01); *G06F 9/4887* (2013.01)

(58) Field of Classification Search
CPC .................... G05B 19/41865; G06F 9/4881; G06F 9/4887
See application file for complete search history.

(56) References Cited

U.S. PATENT DOCUMENTS 8,924,938 B2 * 12/2014 Chang ................. G06F 11/3688
717/126
2002/0062463 A1 * 5/2002 Hines ....................... G06F 8/36
714/38.14

(Continued)

OTHER PUBLICATIONS

Behrmann, Gerd, et al., "Lower and Upper Bounds in Zone Based Abstractions of Timed Automata", Denmark:Aalborg University (accessed from <<http://www.lsv.ens-cachan.fr/Publis/PAPERS/PDF/BBLP-tacas04.pdf>> on Feb. 13, 2017).*

(Continued)

*Primary Examiner* — Kenneth M Lo
*Assistant Examiner* — Michael J Huntley
(74) *Attorney, Agent, or Firm* — Steinfl + Bruno LLP

(57) ABSTRACT

A method and system for scheduling a plurality of concurrent job sequences with constraints of precedence and mutual exclusion is described. In particular, a scheduler for a system performing biological analyzes on clinical samples including non-preemptible jobs which must use a set of resources (machines) and having constraints on release times and execution times is described. The scheduling method uses on-purpose algorithmic solution that extracts the core of DBM data structures and Floyd-Warshall algorithm from the engine of a full-fledged Model Checking tool and tailors it to the specific requirements of the case.

14 Claims, 6 Drawing Sheets

(56) References Cited

U.S. PATENT DOCUMENTS

2003/0083858 A1* 5/2003 Musliner ............... G06F 17/504
                                                        703/22
2004/0083452 A1* 4/2004 Minor ..................... G06F 19/24
                                                        717/109

OTHER PUBLICATIONS

Bengtsson, John, et al., "Timed Automata: Semantics, Algorithms, and Tools", UppsalaUniversity (accessed from <<http://www.seas.upenn.edu/~lee/09cis480/papers/by-lncs04.pdf>> on Feb. 8, 2017).*

PCT International Search Report dated May 8, 2013 for PCT Application PCT/EP2012/075468 filed on Dec. 13, 2012 in the name of Biomerieux.

PCT Written Opinion dated May 8, 2013 for PCT Application PCT/EP2012/075468 filed on Dec. 13, 2012 in the name of Biomerieux.

Bucci et al., Oris: a tool for modeling, verification and evaluation of real-time systems, Int. J. Software Tools Technol. Transfer 2010, 12: 391-403.

Heidari et al., Efficient method for checking the existence of a safety/reachability controller for time petri nets, $10^{th}$ Int'l Conf. on Application of Concurrency to System Design 2010, 201-210.

* cited by examiner

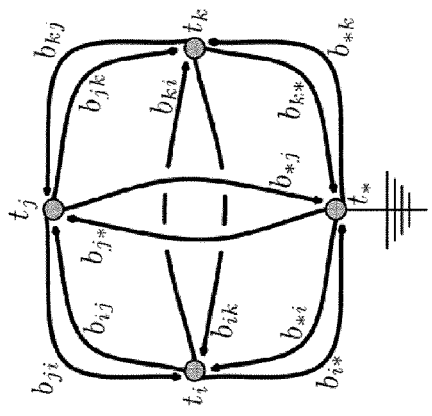
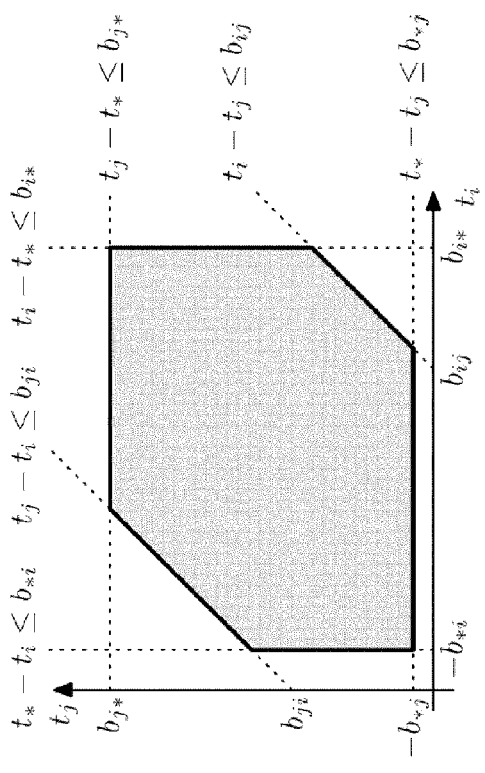
*Fig. 4a*
*Fig. 4b*
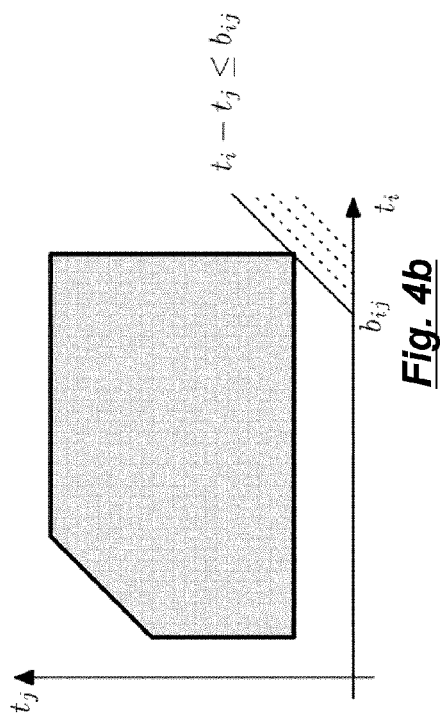
*Fig. 4c*

(A)

| | Pruning (ms) | TIA Pruning (ms) | TIA+WR Pruning (ms) | TIA + WR + EA Pruning (ms) | First | Best |
|---|---|---|---|---|---|---|
| BP1 | 52/52/66 | 36/36/51 | 20/20/25 | 1/1/16 | 25221 | 25221 |
| BP2 | 43/43/43 | 34/34/34 | 25/25/25 | 1/1/20 | 25221 | 25221 |
| BP3 | 72/72/72 | 65/65/65 | 17/17/17 | 1/1/15 | 24461 | 24461 |

(B)

| | Pruning (ms) | TIA Pruning (ms) | TIA + WR Pruning (ms) | TIA + WR + EA Pruning (ms) | First | Best |
|---|---|---|---|---|---|---|
| BP1 | 71/83/83 | 50/62/62 | 31/51/51 | 1/2/40 | 32115 | 25221 |
| BP2 | 73/107/107 | 42/53/53 | 31/42/42 | 1/2/20 | 32875 | 25221 |
| BP3 | 80/84/84 | 45/52/52 | 32/39/39 | 1/2/25 | 32115 | 24461 |

*Fig. 6*

JOB SCHEDULER FOR ELECTROMECHANICAL SYSTEM FOR BIOLOGICAL ANALYSES

CROSS REFERENCE TO RELATED APPLICATIONS

The present application is the US national stage of International Patent Application PCT/EP2012/075468 filed on Dec. 13, 2012 which, in turn, claims priority to European Patent Application EP 11196275.9 filed on Dec. 30, 2011.

FIELD OF TECHNOLOGY

The present invention relates to a method and system for scheduling a plurality of concurrent sequences of timed jobs that are subject to constraints of mutual exclusion and mutual delay. In particular, the present invention relates to a scheduler for a system that performs multiple concurrent biological analyses that apply different analysis protocols on different samples while sharing a set of electromechanical devices.

BACKGROUND

While the problem of scheduling a plurality of concurrent and timed job sequences with constraints of mutual delay and mutual exclusion with allowed bounded time slacks can be applied to a large variety of contexts, in the present application, without loss of generality, we address the problem with reference to a concrete example of a run-time scheduler for an electromechanical system for biological analyses, such as for example the VIDAS system engineered by bioMérieux The system of the present example is able to run a group of multiple concurrent analyses, each alternating steps of biological reaction of the sample and transfer operations carried out by shared electro-mechanical devices; the duration of each reaction step is determined by the biological protocol of the analysis, but bounded waiting times can be added after the completion of each reaction step. This gives raise to the scheduling problem of determining waiting times after each step so as to comply with maximum allowed delays and to avoid conflicts in the usage of shared resources, while maximizing the number of concurrent analyses and minimizing their overall completion time.

With more detail, each type of biological analysis is comprised by a pretreatment phase and an analytic protocol. At the beginning of the analysis, the sample is contained in a test-tube uniquely identified by a barcode, while other tubes contain dilution and incubation fluids and other tubes are empty. During the pretreatment phase, an automatic pipettor repeatedly pours off the sample among the various tubes; each pipettor action lasts for a deterministic amount of time. Waiting times are allowed between successive actions, but they are constrained to range between minimum and maximum values determined by incubation/reaction periods and sample deterioration properties. After completion of the pretreatment phase, the analytic protocol follows a fixed sequence of steps during which the sample is combined with reagents and multiple measurements are taken by a read-head whose operations take deterministic durations (see FIG. 1).

For efficient exploitation of electromechanical components, multiple analyses, possibly of different types, are carried out concurrently. To this end, the system composes multiple sections, one for each analysis. Each section is in turn divided in slots, carrying different samples that can be subject to different pretreatments and can operate on samples of different subjects. However, since the read-head is designed to take measures on a whole section at once, all slots in the same section are constrained to run the same analytic protocol (see FIG. 2).

The pipettor and the read-head are shared among different slots and sections and cannot be used simultaneously by two different analyses. This raises a scheduling problem that must determine feasible values of the initial delay of each pretreatment and waiting times between events of the same analysis. Such values must avoid the need of contemporary actions of the pipettor and the read-head, avoid waiting times beyond allowed bounds and keep the overall time span of the group of analyses as short as possible.

Problem Formulation

The problem can be formally cast in the general notation of job shop scheduling as a set of n independent and non-preemptible jobs $J_1 \ldots J_n$, with release times $r_1 \ldots r_n$ and deterministic Execution Times $e_1 \ldots e_n$, each job being statically assigned to one out of m independent machines $M_1 \ldots M_m$, subject to constraints of precedence and mutual exclusion:

for any two jobs $J_i$ and $J_k$, a precedence constraint may require that the delay between the completion of $J_k$ and the start of $J_i$ range within a minimum $d^-_{ik}$ and a maximum $d^+_{ik}$:

$$d^-_{ik} \le r_i - (r_k + e_k) d^+_{ik}$$

for any two jobs $J_i$ and $J_k$, a mutual exclusion constraint may require that the execution periods of $J_k$ and $J_i$ do not overlap; this may be achieved with either of the following two determinations, which guarantee that $J_i$ starts after completion of $J_k$ or viceversa:

$$r_i \ge r_k + e_k \text{ OR } r_i + e_i \le r_k$$

The scheduling problem amounts to determine the release times $r_1 \ldots r_n$, subject to all prescribed precedence and mutual exclusion constraints, so as to minimize the completion time of the overall plurality of job sequences. FIG. 3a illustrates an instance of the problem: Jobs $J_1$, $J_2$, $J_3$, and $J_4$ are allocated on Machines $M_1$ and $M_2$; Job $J_2$ has a mutual exclusion with respect to $J_4$ and a precedence constraint bounding its start time with respect to the completion time of $J_1$ and $J_3$. A precedence constraints also bounds the delay of the start time of $J_4$ with respect to the completion of $J_3$. FIG. 3b shows a solution for the problem.

The scheduling problem defined above is characterized by the intertwining of non-deterministic release times with mutual exclusion and precedence constraints, and it can thus be conveniently formulated on the ground of non-deterministic formalisms such as Time Petri Nets (TPN) or Timed Automata (TA) through a direct translation of scheduling concepts like jobs, constraints and resources, into places/locations, transitions, pre- and post-conditions. This opens the way to the application of modeling and verification tools that manage the combination of concurrency constraints and non-deterministic timers through symbolic analysis of the state space based on Regions (see R. Alur, D. L. Dill: Automata for modeling real-time systems. In Proc. Of 17th ICALP, 1990) or Difference Bounds Matrix (DBM) zones (see D. Dill. Timing Assumptions and Verification of Finite-State Concurrent Systems. In Proc. Workshop on Computer Aided Verification Methods for Finite State Systems, 1989). In this perspective, the scheduling problem can be formulated as the identification of a witness in the symbolic state space that satisfies a Real Time Model Checking formula (see e.g. A. Fehnker. Scheduling a steel plant with timed automata. In Real-Time Computing Systems and Applications, 1999. RTCSA '99. Sixth International Conference on, pages 280-286, 1999) that selects "all behaviors that reach a completion state within a maximum time T, after traversing only states without conflicts in the usage of resources". The optimal value of T can be obtained through polynomial iteration, which is supported in various tools and notably in the Uppaal environment (see e.g. K. Larsen. Resource-efficient scheduling for real time systems. In Rajeev Alur and Insup Lee, editors, Embedded Software, volume 2855 of Lecture Notes in Computer Science, pages 16-19. Springer Berlin-Heidelberg, 2003.; or I. AlAttili, F. Houben, G. Igna, S. Michels, F. Zhu, and F. W. Vaandrager. Adaptive scheduling of data paths using uppaal tiga. In QFM, pages 1-11, 2009). In the Oris tool (G. Bucci and L. Carnevali and L. Ridi and E. Vicario. Oris: a Tool for Modeling, Verification and Evaluation of Real-Time Systems. International Journal of Software Tools for Technology Transfer, 12(5):391-403, 2010), the optimum value T is derived in direct manner by evaluating the minimum and maximum time spent along each sequence of transitions that satisfy the expected sequencing constraints (E. Vicario. Static Analysis and Dynamic Steering of Time Dependent Systems Using Time Petri Nets. IEEE Trans. on SW Eng., 27(1):728-748, August 2001).

Unfortunately, straight application of this type of symbolic state space analysis techniques faces the problems of state space explosion (as the number of states grows exponentially with the number of jobs) and curse of dimensionality (as the size of data structures encoding each state grows quadratically with the number of sequences). This results in memory and time complexity that are by far not affordable for an on-line scheduler, even if computation is performed on a conventional PC, which is often not the case in industrial applications.

Just to figure out the order of magnitude of practical complexity, state space analysis based on DBM zones with the Oris tool was experimented on the TPN representation of a simplistic case made of two Sections, three Slots per Section, and deterministic delays: the TPN enumeration procedure would produce a huge state space of 255128 DBM state classes, which requires about 20 minutes on a dual-core 2 GHz desktop computer, with 4216 possible paths from the initial state to the end terminal node.

Even applying state of the art techniques for reducing complexity through model simplification, end even partitioning the state space through DBM Zones (which are much more compact than Regions), processing times and memory demand of this class of state space analysis techniques are not compatible with the intended use within an industrial application as the one described above: this requires that the scheduling problem be solved on-line in a near-real-time approach, and that its execution be affordable within an embedded component that runs on limited processing and memory resources. Hardware resources normally available in this kind of biological testing machines (but more generally in industrial electromechanical machines) is very limited and not compatible with the huge demand of such a complex mathematical algorithm implementation.

A solution that could trade generality of analysis for efficiency in the specific problem so as to run faster and with lower demand of memory and processing power would be therefore highly desirable.

OBJECTS OF THE DISCLOSURE

It is an object of the present disclosure to overcome at least some of the problems associated with the prior art.

A further object of the present invention is to provide a method that requires limited memory and processing time for computing an acceptable and efficient schedule for a plurality of concurrent sequences of timed steps subject to constraints of mutual exclusion and mutual delay and allowed to be delayed by bounded waiting times.

This is represented as a scheduling problem arising in a real industrial electromechanical system, which includes finding feasible timings for the actions performed by a set of shared electromechanical components so as to complete a set of concurrent biological analyses in the minimum possible timespan while satisfying mutual exclusion and mutual delay constraints. In the specific example here described, the scheduling algorithm is required to run on board of the hardware shipped with an electromechanical system presently equipped with a 200 MHz CPU and with less than 10 MB of memory. Moreover, in order to guarantee an adequate responsiveness for the operators interacting with the system, the algorithm is allowed to find sub-optimal yet efficient solutions but it is required to end conclusively within a short amount of time in the order of few seconds.

Another object of the invention is to provide an electromechanical system that executes a plurality of concurrent biological analyses, each alternating periods of reaction and transfer operations performed by shared devices under timing and mutual delay constraints determined by the biological analysis protocol, and under mutual exclusion constraints determined by the exclusive usage of shared devices.

SUMMARY

The present disclosure provides a scheduling method as set out in the accompanying claims.

According to a first embodiment, the present disclosure provides a scheduling method, in a system adapted to execute a plurality of non-preemptible jobs $J_1 \ldots J_n$, with deterministic execution times $e_1 \ldots e_n$, each job being statically assigned to one of m independent machines $M_1 \ldots M_m$, for determining a release time $r_1 \ldots r_n$ for each job $J_1 \ldots J_n$ so as to minimize the completion time of overall set of jobs, while respecting the following precedence constraint:

for a predetermined set of pairs $J_x$ and $J_y$ of the plurality of jobs, the delay between the completion of $J_y$ and the start of $J_x$ range within a minimum delay $d^-_{xy}$ and a maximum delay $d^+_{xy}$:

$$d^-_{xy} \leq r_x - (r_y + e_y) \leq d^+_{xy}$$

and the following exclusion constraints:

for a predetermined set of pairs $J_i$ and $J_k$ of the plurality of jobs, one of the following two determinations of exclusion constraint is fulfilled:

$$r_i \geq r_k + e_k \text{ OR } r_i + e_i \leq r_k$$

so that the execution periods of $J_k$ and $J_i$ do not overlap, the method comprising the steps of: A) building a frontier set including a Difference Bound Matrix (DBM) zone that collects release times satisfying the precedence constraints; B) selecting one of the DBM zones and removing it from the frontier set: C) responsive to the selected DBM zone not satisfying at least one exclusion constraint of one pair $J_i$ and $J_k$ of the predetermined set of pairs, building one restricted zone of the selected DBM zone per each of the two determinations resolving the conflict ($r_i \geq r_k + e_k$ or $r_i + e_i \leq r_k$); D) checking if the restricted DBM zones are non-empty and adding the non-empty restricted DBM zones to the frontier set; E) repeating the steps B to D until a selected DBM zone satisfies all the exclusion constraints.

The method of the present invention allows scheduling of concurrent sequences of timed jobs with constraints of mutual exclusion and delay, by capturing sets of equivalent possible solutions through Difference Bound Matrix (DBM) zones and by organizing the identification of a feasible solution as a search in a graph-theoretical structure. This enables a series of algorithmic optimizations and heuristic approaches to speed the search of solutions while keeping an exact (i.e. not quantized nor approximated) representation of the set of possible timing configurations.

According to another embodiment the step of repeating is performed until all DBM zones in the frontier set satisfies all the exclusion constraints. Alternatively the step of repeating is stopped when a predetermined maximum search time has been reached. In another embodiment an optimal solution (schedule) is selected within all DBM zones satisfying all exclusion constraints.

According to another embodiment, the selection of step B is based on an heuristic evaluation, including the so called longest-interval heuristic (safe) or the so called shortest-interval heuristic (greedy).

According to another embodiment, a computer program for performing the method is provided.

According to a further embodiment of the invention, a system implementing the method above is provided. Such system can be used for example in an electromechanical apparatus for performing biological analyses.

The present invention offers a number of benefits. One of the advantages of a preferred embodiment of the present invention is that a complex scheduling operation can be performed with limited time and hardware resources. In principle the problem can be formulated as a case of Real Time Model Checking and solved through well-established state space analysis approaches. However, such enumerative approaches are not viable in the specific setting, due to hardware restrictions imposed by the expected embedded platform. With the method of the present invention a direct on-purpose adaptation of DBM theory largely reduces the complexity of the algorithm, also by allowing the adoption of heuristics that drive the search toward feasible solutions. In a preferred embodiment of the present invention, subsequent algorithmic refinements permit to further reduce computation times, attaining the expected performance requirements.

An additional advantage of the method and system according to an embodiment of the present invention is that of allowing the case where one or more analyses are added to an ongoing schedule by reclaiming unused resources without jeopardizing the execution of already scheduled analyses.

BRIEF DESCRIPTION OF THE DRAWINGS

Reference will now be made, by way of example, to the accompanying drawings, in which:

FIG. 4*a* shows a 2-dimensional DBM encoding the solution set for a pair of variables $t_i$ and $t_j$. FIG. 4*b* shows a 2-dimensional DBM highlighting the presence of a non-effective constraint. FIG. 4*c* shows the graph-theoretical representation of a DBM involving the three variables $t_i$, $t_j$ and $t_k$.

FIG. 6 shows the results of performance testing experiments with two different heuristics, according to a preferred embodiment of the present invention.

DETAILED DESCRIPTION OF PREFERRED EMBODIMENTS

Figure 1:
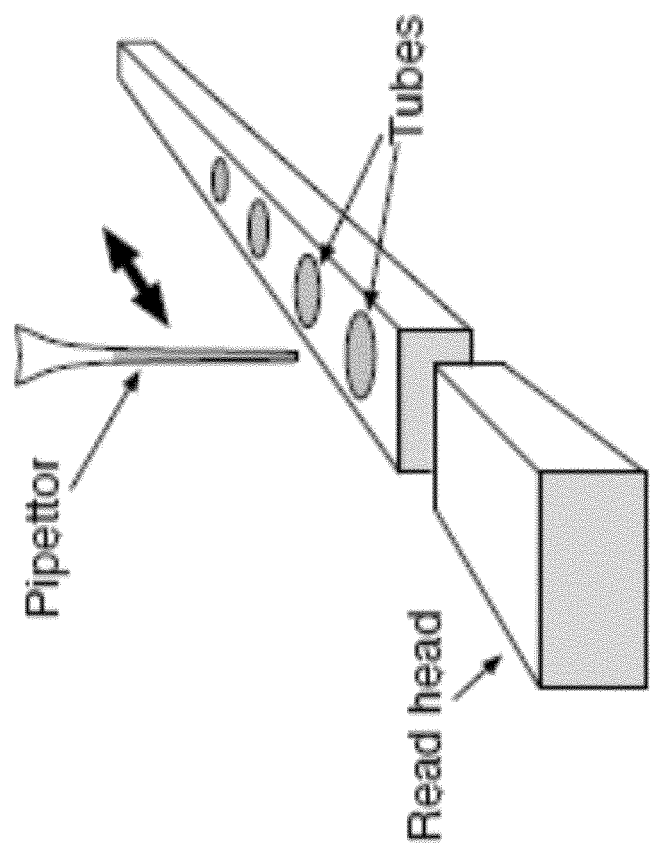
FIG. 1 is a schematic representation of the physical architecture of system components running a single analysis in an electromechanical apparatus for performing biological tests.
Figure 2:
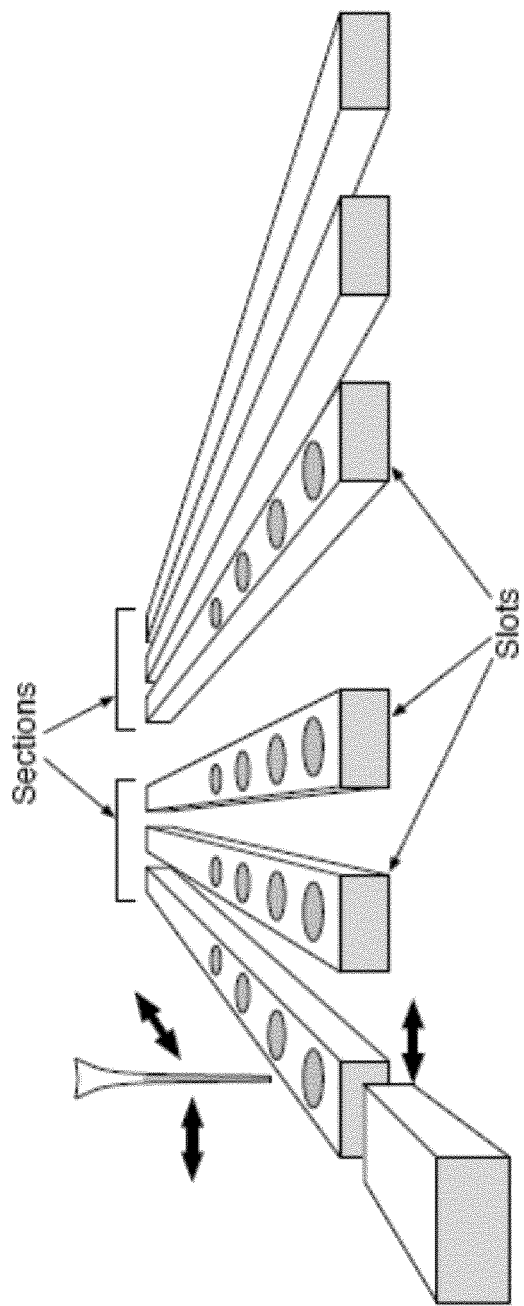
FIG. 2 is a schematic representation, of the physical architecture of the overall system composing multiple analyses in slots and sections in an electromechanical apparatus for performing biological tests according to an embodiment of the present invention.
Figure 3A:
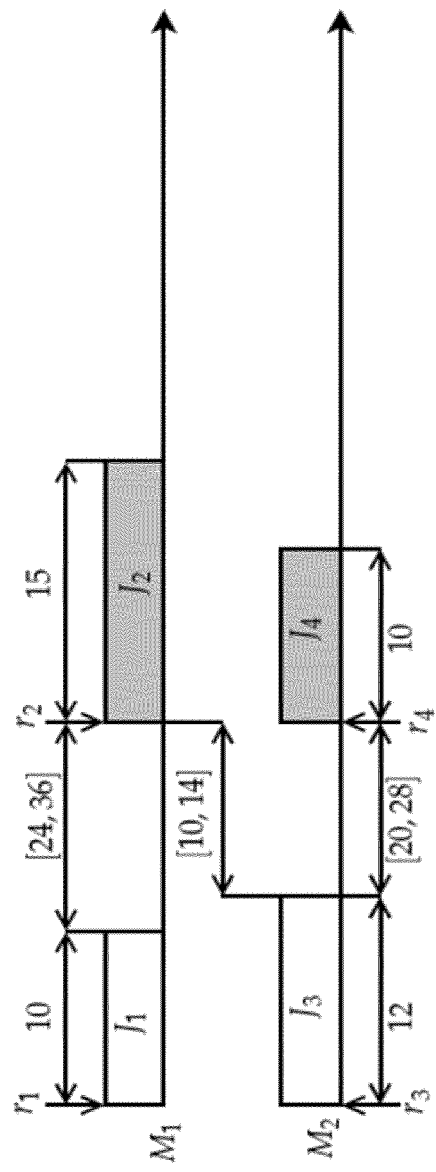
FIG. 3*a* is a schematic representation of an instance of the scheduling problem of determining the release times time $r_1 \ldots r_n$, subject to all prescribed precedence and mutual exclusion constraints, so as to minimize the completion time of overall set of jobs.
Figure 3B:
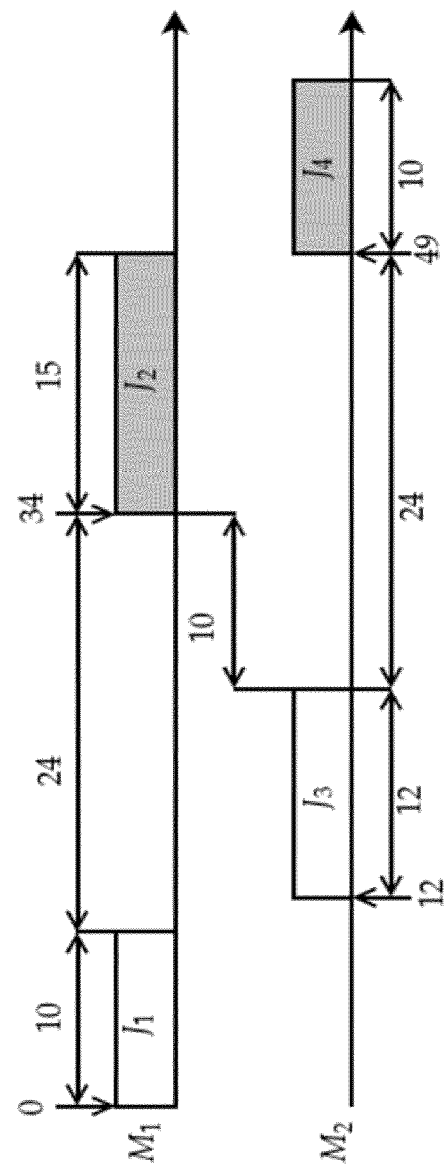
FIG. 3*b* is a possible solution that determines the value of release times.

To the purposes of the subsequent treatment, we introduce here the main concepts on which the scheduling solution relies: Difference Bound Matrices (DBMs) and Floyd-Warshall algorithm.

A DBM encodes a system of inequalities identifying a set of solutions for a vector of N variables $r = \langle t_1 \ldots t_N \rangle$ $$D = \begin{cases} \tau_i - \tau_j \leq b_{ij} & i,j \in [1 \ldots N] \cup *, b_{ij} \in \mathbb{Q} \\ \tau_* = 0 & \end{cases}$$

Any 2-dimensional projection of a DBM results in a polyhedron of the type represented in FIG. 4*a*. A DBM may be not completely formed when one or more constraints are not effective (see FIG. 4*b*); in this case an infinite number of values for these constraints yield the same set of solutions. The limiting value, such that any further restriction would change the solution set, is proven to exist and be unique if and only if the following triangular inequality holds:

$$b_{ij} \leq b_{ik} + b_{kj} \forall i,j,k$$

This condition identifies the concept of normal form, that is defined as the representation that satisfies the triangular inequality.

The set of constraints of a DBM can be conveniently cast into a graph-theoretical formulation (see FIG. 4*c*) in which nodes of the graph represent variables, and edges are labeled with values of DBM coefficients (i.e. the edge that connects nodes corresponding to variables i and j is labeled with coefficient $b_{ij}$): in this perspective, the normal form of a DBM becomes an all-shortest-path problem where $b_{ij}$ coefficients are computed as the shortest path from node i to j.

It is easily proven that the assumption that DBM is not empty excludes the existence of negative cycles (i.e. cycles in the graph whose coefficients sum up to a negative value). Thus, the problem can be solved by N repeated applications of the well-known Dijkstra algorithm, with total complexity $O(N \cdot N^2)$. Floyd-Warshall algorithm provides a direct solution that still runs in $O(N^3)$, but it performs much simpler operations than Dijkstra within its inner cycle and is preferable when dealing with dense adjacency matrices, like those corresponding to DBM domains (see E. Vicario. Static Analysis and Dynamic Steering of Time Dependent Systems Using Time Petri Nets. IEEE Trans. on SW Eng., 27(1): 728-748, 2001).

We report in Alg. 1 the Floyd Warshall pseudo-code. Its core invariant is variable $b_{ij}^{k}$, which encodes "the shortest path from j to i under the restriction that only vertices with index higher than k can be visited as intermediary nodes". Under this statement, it is clear that $b_{ij}^{N}$ can be given the initial values of coefficients $b_{ij}$, which gives meaning to the first for-loop in the code. It is also clear that $b_{ij}^{0}$ comprises the final solution of the problem, which in the code is attained by decreasing k from N to 1 through the second for-loop. The real core of the algorithm is thus restrained to the way how the nested double loop on i, j is able to derive $b_{ij}^{k-1}$ from $b_{ij}^{k}$.

---

ALGORITHM 1: FLOYD-WARSHALL ALGORITHM

```
1  begin
2     for [i, j] ∈ [0, N − 1] × [0, N − 1] do
3        b_ij^{N−1} = b_ij;
4     end
5     for k = N − 1 → 0 do
6        for [i, j] ∈ [0, N − 1] × [0, N − 1] do
7           b_ij^{k−1} = min{b_ij^k, b_ik^k + b_kj^k};
8        end
9     end
10 end
```

---

Difference Bound Matrix data structures and Floyd-Warshall algorithm constitute the basic ground for general-purpose Verification and Model Checking tools, which in principle could provide the functionality to solve the scheduling problem. In a preferred embodiment of the present invention, in order to restrain the complexity of state space analysis of a general model, we adapted the algorithmic core of Difference Bound Matrix (DBM) Zones to the identification of timings that result from different orderings between actions subject to mutual exclusion constraints by leveraging on the specific regular structure of scheduled sequences. This resulted in various optimized adaptations of the Floyd-Warshall algorithm which is used to maintain DBM Zones in normal form.

We then organized DBMs corresponding to different determinations of different sets of mutual exclusion constraints in a graph-theoretical structure allowing incremental traversal. In broad terms, the algorithm iteratively constructs candidate solutions by incrementally adding exclusion constraints and verifying the conformance of temporal parameters with the constraints imposed by the problem; in this setting, DBM structures are used to encode the set of constraints that determine precedences and exclusions among jobs, while Floyd-Warshall algorithm is repeatedly invoked to keep DBMs in their normal form, in order to allow (efficient) manipulation and comparison of obtained results.

The algorithm initially builds a DBM zone $D_{prec}$ representing all precedence constraints of the problem. Then, it repeatedly restricts the zone $D_{prec}$ by adding each exclusion constraint in its two different determinations, and discarding restricted zones that turn out to be empty. Any non-empty zone that has been restricted with some determination for all exclusion constraints comprises a set of solutions for the scheduling problem. This solution univocally corresponds to a single determination of exclusion constraints, and its DBM zone contains all and only the timings that are consistent with these determinations. The optimal timing can be derived in straightforward and direct manner from the normal form of the DBM zone.

In this perspective, our scheduling algorithm can be regarded as the traversal of a graph-theoretical structure, where each node of the structure is associated with a DBM Zone. In particular: the root is the zone $D_{prec}$ that satisfies all precedences but no exclusions; intermediate nodes restrict $D_{prec}$ with a subset of exclusion constraints in some determination; leaf nodes restrict $D_{prec}$ with all exclusion constraints in some determination; each edge of the graph-theoretical structure represents the choice for some determination of one or more exclusion constraints. Without loss of generality, Alg. 2 reports the algorithm pseudo-code of an implementation according to a preferred embodiment of the present invention: in the specific case each edge adds a single mutual exclusion constraint, so that the graph-theoretical structure becomes a binary tree.

---

ALGORITHM 2: SCHEDULING ALGORITHM

```
1  begin
2     Dprec = DBM encoding all precedence constraints;
3     Normalize(Dprec);
4     Enqueue(<Dprec, 0>);
5     Dsol = dummy solution;
6     while QueueIsNotEmpty( ) and time limit is not exceeded do
7        <D, c> = Dequeue( );
8        Dr = AddRightConstraint(D, c + 1);
9        Normalize(Dr);
10       if (IsNotEmpty(Dr)) then
11          if (c + 1 == C) then
12             Dsol = GetBestSolution(D_r, Dsol);
13          else
14             Enqueue(<D_r, c + 1>);
15       Dl = AddLeftConstraint(D, c + 1);
16       Normalize(Dl);
17       if (IsNotEmpty(D_l)) then
18          if (c + 1 == C) then
19             Dsol = GetBestSolution(Dl , Dsol);
20          else
21             Enqueue(<Dl, c + 1>);
22    end
23 end
24 return Dsol;
25 end
```

---

The implementation relies on some data structures and invariants:

The index c represents the number of exclusion constraints added to the restriction, which also takes the meaning of depth in the binary tree; besides, C is the number of all exclusion constraints, so that a node at depth C is a leaf.

$D_{sol}$ represents the best identified solution at any point of the computation. It is initialized with some dummy valuation, which might for instance be a trivial and inefficient schedule or some symbolic value that can be regarded as worse than any other one.

The algorithm relies on a queue that contains nodes in the tree, each identified by a DBM zone D and a depth index c.

Exclusion constraints are assumed to be sorted so that an index c uniquely identifies an exclusion constraint.

The algorithm also relies on various functions:

Normalize(D) applies Floyd-Warshall algorithm to normalize the DBM D taken as parameter;

Enqueue(<D, c>) and Dequeue( ) perform respectively addition and extraction operations on the queue; QueueIsNotEmpty( ) checks if the queue contains at least one element;

AddRightConstraint(D, c) restricts D by adding the constraint of order c in its right determination (i.e. if the constraint is between jobs Ji and Jj, then the added constraint is ri−rj≥ej); in the same manner, AddLeftConstraint(D, c) restricts D by adding the constraint of order c in its left determination (i.e. if the constraint is between jobs Ji and Jj, then the added constraint is $r_j - r_i \geq e_i$).

GetBestSolution(D',D'') receives two DBM zones and selects the one that includes the best timing, e.g. the timing that minimizes the overall completion time for all job sequences.

The above described example is based on the choice between a pair of determinations for each mutual exclusion constraint for each pair of jobs, so that the graph-theoretical structure becomes a binary tree. Those skilled in the art will appreciate that other implementations are possible, e.g. if the algorithm could choose among a set of determinations allowing for the presence of minimum slack delays between conflicting jobs (i.e. constraints of the type $r_i - r_j \geq e_j + d_{ij}$, where $d_{ij}$ is a positive quantity), then the resulting structure would become an k-ary tree, with k equal to the number of possible slack delays associated with each mutual exclusion constraint.

The organization of the algorithm gives space to various possible optimizations that significantly affect performance, outlined in the following.

Heuristic Choice Between Exclusion Constraints Determinations

Depending on the actual implementation of Enqueue(<D, c>) and Dequeue( ) operations, various policies can be enforced for the visit of the search tree (i.e. breadth-first, depth-first, etc.). We adopted a depth-first visit, which is the simplest natural choice as the objective of the algorithm is to find, as soon as possible, a leaf associated to a solution for the scheduling problem. Enumeration queue Q is thus implemented as a LIFO queue.

Algorithm behaviour is also determined by the order in which $D_r$ and $D_i$ are added to the queue (i.e. the order of lines 14 and 21 of Alg. 2): for instance, if $D_i$ is always added first, a preorder visit is performed; vice versa, a postorder visit is obtained by always adding $D_r$ first. In our case, a good heuristics should always make choices that most likely lead to feasible solutions without adding too much overhead to the search algorithm. We report here two simple heuristics that influence algorithm behaviour according to the conflicting values of tightness and feasibility:

feasibility represents the property of exploring first loose configurations that most likely can be extended up to completion without encountering unfeasible constraints. Intuitively, this can be achieved by selecting the exclusion constraint that leaves more degree of freedom to constrained jobs $J_i$ and $J_j$ in the resulting configuration, i.e. the one for which the distance between release times $|r_i - r_j|$ is free to range in the largest interval (we called it "safe" or "longest-interval" heuristics);

tightness property aims at the opposite goal of obtaining compact schedules, even at the risk of encountering more unfeasible solutions. As a consequence, the resulting heuristics (which we called "greedy" or "shortest-interval" heuristics) selects the constraint that narrows the most the distance between $r_i$ and $r_j$.

Problem Simplification Through Time Intervals Analysis

The order given to exclusion constraints impacts on the performance of the algorithm conditioning the early discard of determinations that do not lead to complete schedules. Moreover, some refinements aim to the reduction of the number of conflicting job pairs C; although this kind of optimizations do not impact on the theoretical complexity of the algorithm, in most practical cases they are able to drastically reduce computation time. Some of the choices on which exclusion constraint should be added at each step of the algorithm are already resolved by constraints of $D_{prec}$; for instance, if two events requiring the same resource are explicitly constrained to occur in sequence, the exclusion constraint is redundant and it can be ignored. In the specific application this determines a strong speed-up, as jobs represent system actions which are naturally structured along linear sequences. A more subtle but highly effective reduction can be achieved considering those event pairs that, even if not being explicitly constrained, are assured to be non-overlapping by delays configuration. The simplest example of such a condition is constituted by three jobs $J_i$, $J_j$ and $J_k$ such that $J_i$ and $J_k$ are both constrained to start after the completion of $J_j$, and $d_{ij}^+ + e_i < d_{kj}^-$. The satisfaction of these three conditions, in fact, guarantees that $J_i$ and $J_k$ are not-overlapping even if no explicit constraint exists between them. More complex interactions are possible, requiring an higher effort to be identified; moreover, as constraints are iteratively added during the search procedure, similar conditions can dynamically occur in the construction of zones $D_r$ and $D_i$ (lines 8 and 15 of Alg. 2), even if they are not verified in the initial $D_{prec}$ zone; however, a straightforward detection of such conditions can be obtained through direct observation of the normal form of zone D extracted from the queue (line 7 of the Alg. 2). In turn, this can be translated into an optimization of the search algorithm that enables early conflicts detection, preventing the unnecessary construction and normalization of zones $D_r$ and $D_i$.

Reducing Complexity Through Warm-Restart Floyd-Warshall Algorithm

A second optimization manages to reduce the asymptotical time complexity of the procedure, as it operates on the structure of its core engine, the Floyd-Warshall algorithm.

The standard formulation of Floyd-Warshall algorithm used to find the normal form of DBMs (Alg. 1) runs in time $O(N^3)$ with respect to the dimensionality of the zone (in our case, with respect to the number of jobs). However, the normalization invoked at lines 9 and 16 of Alg. 2 presents a peculiarity enabling a specific algorithmic refinement; in fact, zones $D_r$ and D, are obtained adding a single constraint to zone D extracted from the queue at step 7, which is in normal form. This implies that only some of the coefficients of $D_r$ and $D_i$ are affected by the normalization; according to this, Floyd-Warshall algorithm can be rewritten to run in time $O(N^2)$ (see Alg. 3).

---

ALGORITHM 3: OPTIMIZED FLOYD-WARSHALL

```
1  begin
2    for k = 0, . . . , N − 1 do
3      if b_kj > b_ki + b_ij then
4        b_kj = b_ki + b_ij;
5        for l = 0, . . . , N − 1 do
6          b_kl = min{b_kl, b_ki + b_ij + b_jl};
7        end
8      end
9    end
10   for h = 0, . . . , N − 1 do
11     b_ih = min{b_ih, b_ij + b_jh};
12   end
13 end
```

---

Problem Simplification Through Events Aggregation

A third optimization has been introduced to reduce the size of DBM matrix N when the problem comprises jobs with immediate delays, i.e. jobs that are constrained to run immediately one after the other. This can happen if and only if a precedence constraint is set between the two jobs $J_i$ and $J_j$ such that $d_{ij} = d_{ij}^+ = d_{ij}^- = 0$.

In this case jobs $J_i$ and $J_j$ can be merged into a single job $J_{ij}$ with Release Time $r_{ij}=r_f$ and Execution Time $e_{ij}=e_i+e_j$. This results in a DBM matrix reduced by one row and one column.

Low-Level Code Optimizations

The core of the search algorithm in Alg. 2 amounts to just some dozens of lines of code; in order to successfully deploy a production version on the target platform, a lightweight ANSI-C library has been implemented, providing accessory functionalities like input-output management, execution time control and on-line switching among different heuristics, for a total of about 2600 lines of code. Due to the severe hardware limitations, several code optimizations has been adopted in addition to the algorithmic refinements, so as to further reduce space and time cost. The most important among them involves the actual encoding of intermediate solutions. In the pseudo-code of Alg. 2 a queue is used to spool intermediate solutions D as they are generated; although this is the standard approach adopted in search algorithms, in the present case it would easily saturate the available memory. As an alternative solution, the implemented algorithm entirely memorizes only the initial zone $D_{prec}$ and the actual intermediate zone D, using a stack to encode a compact representation of exclusion constraints chosen until then. Whenever a rollback is due, the algorithm rebuilds a new solution from $D_{prec}$ according to the informations found into the stack; in this case, since multiple coefficients are modified, a full normalization (i.e. the one of Alg. 1) is required, but this small overhead is largely justified by the strong reduction in space occupation.

Figure 5:
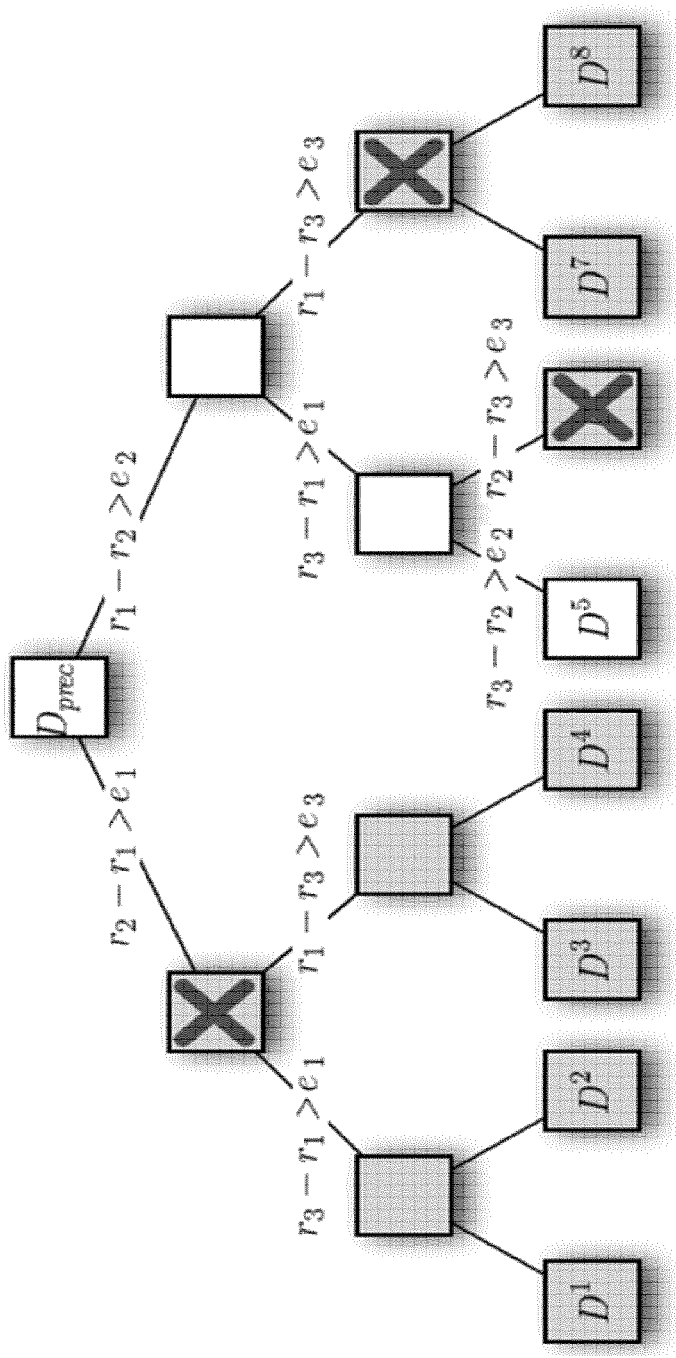
FIG. 5 shows an example of the binary tree that is constituted by subsequent choices for the exclusion constraints of the scheduling method according to a preferred embodiment of the present invention.

FIG. 5 is a schematic representation of the solution according to a preferred embodiment of the present invention. The search is formulated as a tree traversal which performs a series of successive binary decision on exclusion constraints. The search algorithm aims at finding zones that produce feasible solutions and selecting among such solutions the one corresponding to the optimal solution. The key features of the present method is that of enabling heuristic selection of "reasonable" paths according to predetermined criteria so that a solution can be found without exploring all possible cases. In the present example we consider two possible heuristics: "greedy" (or shortest-interval heuristic) and "safe" (or longest-interval heuristic). The crosses indicates a node in the tree from where no possible solutions can be found, therefore all nodes and leaves departing from such node can be discarded without further calculations.

The problem simplifications mentioned above reached the results of speeding the computation by reducing complexity. In particular, the time interval analysis minimizes the number of independent constraints; the warm restart reduces complexity of the core step from $O(N^3)$ to $O(N^2)$; while event aggregation reduces the number of variables.

Table A and B of FIG. 6 show the results of a performance test with a comparison of the present method using two different implementations, respectively with a "greedy" heuristic and with a "safe" one.

Experimental results were measured on a desktop computer (with dual-core 2 GHz processor). This is believed to be around 10 times faster than a real environment on a electromechanical machine as the one where the present algorithm should be run (i.e. an execution on a target platform would take about 10 times more than the same execution on the desktop computer of the present test).

We ran our search algorithm on a test suite composed by three Analytical Protocols (AP1-AP3), which are realistic examples taken from real-world biological analyses practice:

AP1: 2 sections, 1 to 3 pipettor actions per slot, 4 read-head actions per section, non-deterministic delays;

AP2: 2 sections, 1 to 3 pipettor actions per slot, 4 read-head actions per section, non-deterministic delays;

AP3: 2 sections, 1 pipettor action per slot, 4 read-head actions per section, non-deterministic delays;

Experiments has been performed by incrementally adding proposed refinements to the search algorithm, which is run adopting both shortest-interval and longest-interval heuristics. Results are shown in Tables A and B of FIG. 6 respectively; it is particularly worth noting how they compare to the 20-minutes computation required by the Model Checking approach. As expected, successive refinements of the algorithm produce better results: in particular, an higher depth of the search tree gives major relevance to the pruning performed through time interval analysis and to the speed-up of Floyd-Warshall algorithm. Another interesting result comes from the comparison between longest-interval and shortest-interval heuristics; on realistic test cases, the latter has shown better performances than the former, both in performing a full search and in converging to the best solution (on the selected cases, shortest-interval heuristics always finds the best solution as the first one).

For each tested biological protocol (AP1-AP3) and each optimization level (Basic, TIA, TIA+WR, TIA+WR+EA), performance is characterized as a triple first/best/total where first is the time at which the first solution has been found, best is the time at which the best solution has been found and total is the total execution time. TIA is an acronym for Time Interval Analysis, WR is an acronym for Warm Restart and EA is an acronym for Event Aggregation. On the last two columns, we also report the time span of the first and the best solutions found.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements described in connection with any disclosed embodiment of the disclosure may be incorporated in any other embodiment as a general matter of design choice.

For example, similar considerations apply if the components have different structure or include equivalent units.

The invention claimed is:

1. A scheduling method of a processor-controlled system including a plurality of machines and at least one processor, configured to be stored in the system and adapted to execute, via the at least one processor, a plurality of non-preemptible electromechanically driven jobs $J_1 \ldots J_n$, with deterministic execution times $e_1 \ldots e_n$, each job of the plurality of non-preemptible electromechanically driven jobs being statically assigned to one of m independent machines $M_1 \ldots M_m$ of the plurality of machines, for setting a release time $r_1 \ldots r_n$ for each job $J_1 \ldots J_n$ so as to minimize a completion time of overall set of jobs, while respecting precedence constraints comprising:

for a predetermined set of pairs $J_x$ and $J_y$ of the plurality of jobs, a delay between completion of $J_y$ and start of $J_x$ range within a minimum delay $d^-_{xy}$ and a maximum delay $d^+_{xy}$:

$$d^-_{xy} \leq r_x - (r_y + e_y) \leq d^+_{xy}$$

and respecting exclusion constraints comprising:
for a predetermined set of pairs $J_i$ and $J_k$ of the plurality of jobs, one of two determinations of exclusion constraint is fulfilled, the two determinations being:

$$r_i \geq r_k + e_k \text{ OR } r_i + e_i \leq r_k$$

so that execution periods of $J_k$ and $J_i$ do not overlap,
the method comprising the steps, executed on the one or more processors, of:
A) building a frontier set including a plurality of Difference Bound Matrix (DBM) zones that collect release times satisfying the precedence constraints;
B) selecting one of the plurality of DBM zones and removing it from the frontier set;
C) responsive to the selected DBM zone not satisfying at least one exclusion constraint of one pair $J_i$ and $J_k$ of the predetermined set of pairs, building one restricted zone of the selected DBM zone per each of the two determinations resolving a conflict defined by ($r_i \geq r_k + e_k$ or $r_i + e_i \leq r_k$);
D) checking if the restricted DBM zones are non-empty and adding the non-empty restricted DBM zones to the frontier set; and
E) repeating the steps B to D until a selected DBM zone satisfies all the exclusion constraints.

2. The method of claim 1, wherein the step of repeating is performed until all DBM zones in the frontier set satisfies all the exclusion constraints.

3. The method of claim 2, wherein the step of repeating is stopped when a predetermined maximum search time has been reached.

4. The method of claim 1, further including selecting, by the processor, an optimal schedule within all DBM zones satisfying all exclusion constraints.

5. The method of claim 1, wherein the step B is performed relying on a heuristic estimation.

6. The method of claim 5, wherein the heuristic includes a longest-interval (safe) heuristic, estimating the capability of the selected DBM zone of satisfying all exclusion constraints.

7. The method of claim 5, wherein the heuristic includes a shortest-interval (greedy) heuristic, estimating the capability of the selected DBM zone of minimizing the overall completion time.

8. The method of claim 1, wherein, in the execution of step C, a normal form of restricted zones is derived using an optimized version of Floyd-Warshall algorithm that reduces complexity from $O(n^3)$ to $O(n^2)$, where n is a count of the plurality of non-preemptible electromechanical jobs, by avoiding a recomputation of DBM coefficients that are not included in one of the restricted DBM zones.

9. The method of claim 8, wherein code optimizations are implemented in order to limit time complexity of the algorithm and space occupation of employed data structures.

10. The method of claim 1, wherein the system includes a plurality of shared resources, each job requiring the availability of at least one of the plurality of shared resources for execution, an exclusion constraint between each predetermined pair of jobs represents the requirement of availability of a same resource of the plurality of shared resources by both jobs of the pair.

11. The method of claim 10, wherein the plurality of shared resources includes a logical, electronic, or mechanical unit that is employed by at least one scheduled job for the evaluation of its task.

12. A processor, comprising:
a computer program, including program code means, configured for performing the method of claim 1 when running on the processor.

13. A computer, comprising:
a non-transitory storage medium storing a computer program, the computer program adapted to perform the steps of the method of claim 1 when running on the computer.

14. An electromechanical system for performing biological analyses, said electromechanical system performing the method of claim 1.

* * * * *